United States Patent [19]

Ichikawa et al.

[11] Patent Number: 5,418,763
[45] Date of Patent: May 23, 1995

[54] DISC RECORDING SYSTEM

[75] Inventors: Atsushi Ichikawa, Tsukuba; Masateru Watanabe, Chigasaki; Tokuya Kaneda, Odawara; Toshihiko Ishizaka, Fuchu; Shigeru Nakamura, Tachikawa, all of Japan

[73] Assignee: Hitachi, Ltd., Tokyo, Japan

[21] Appl. No.: 91,914

[22] Filed: Jul. 16, 1993

[30] Foreign Application Priority Data

Jul. 16, 1992 [JP] Japan ................... 4-189481

[51] Int. Cl.$^6$ ............................................ G11B 17/22
[52] U.S. Cl. ........................... 369/30; 369/36; 369/178
[58] Field of Search ............. 369/30, 34, 36, 37, 369/38, 40, 42, 178, 181, 192, 196, 13

[56] References Cited

U.S. PATENT DOCUMENTS

| | | | |
|---|---|---|---|
| 4,849,838 | 7/1989 | Kogo et al. | 369/30 |
| 4,878,137 | 10/1989 | Yamashita et al. | 369/36 |
| 5,197,055 | 3/1993 | Hartung et al. | 369/36 |
| 5,267,225 | 11/1993 | Fukasawa et al. | 369/36 |

FOREIGN PATENT DOCUMENTS

| | | | |
|---|---|---|---|
| 0284445 | 9/1988 | European Pat. Off. | 369/34 |
| 0388056 | 9/1990 | European Pat. Off. | 369/30 |
| 0479626 | 4/1992 | European Pat. Off. | 369/178 |
| 2-276056 | 11/1990 | Japan . | |
| 4291054 | 10/1992 | Japan | 369/178 |

Primary Examiner—Georgia Y. Epps
Assistant Examiner—Tan Dinh
Attorney, Agent, or Firm—Fay, Sharpe, Beall, Fagan, Minnich, & McKee

[57] ABSTRACT

A sealed library type optical disc unit is combined with an exchangeable cartridge type disc unit in a data storage and retrieval system. The optical discs within the sealed unit are exposed, as opposed to being encased in cartridges. A data access unit can quickly and efficiently access the exposed optical discs for loading them on an optical disc recording/reproducing unit. A control unit manages the transfer of data from a host computer to the storage and retrieval system. If a data write request exceeds the storage capacity of the optical disc within the sealed space, the excess data is written to the cartridge type disc unit without intervention by an operator and without interruption of the post processor. During a read operation, if data is requested that has been previously recorded on a cartridge type disc, the disc ID is displayed so that an operator can insert the disc into the cartridge type disc unit for the read operation. Data can also be copied from the cartridge type disc to the sealed space discs and vice versa, as well as between the sealed space discs by inputting such a command to a keyboard by an operator.

29 Claims, 4 Drawing Sheets

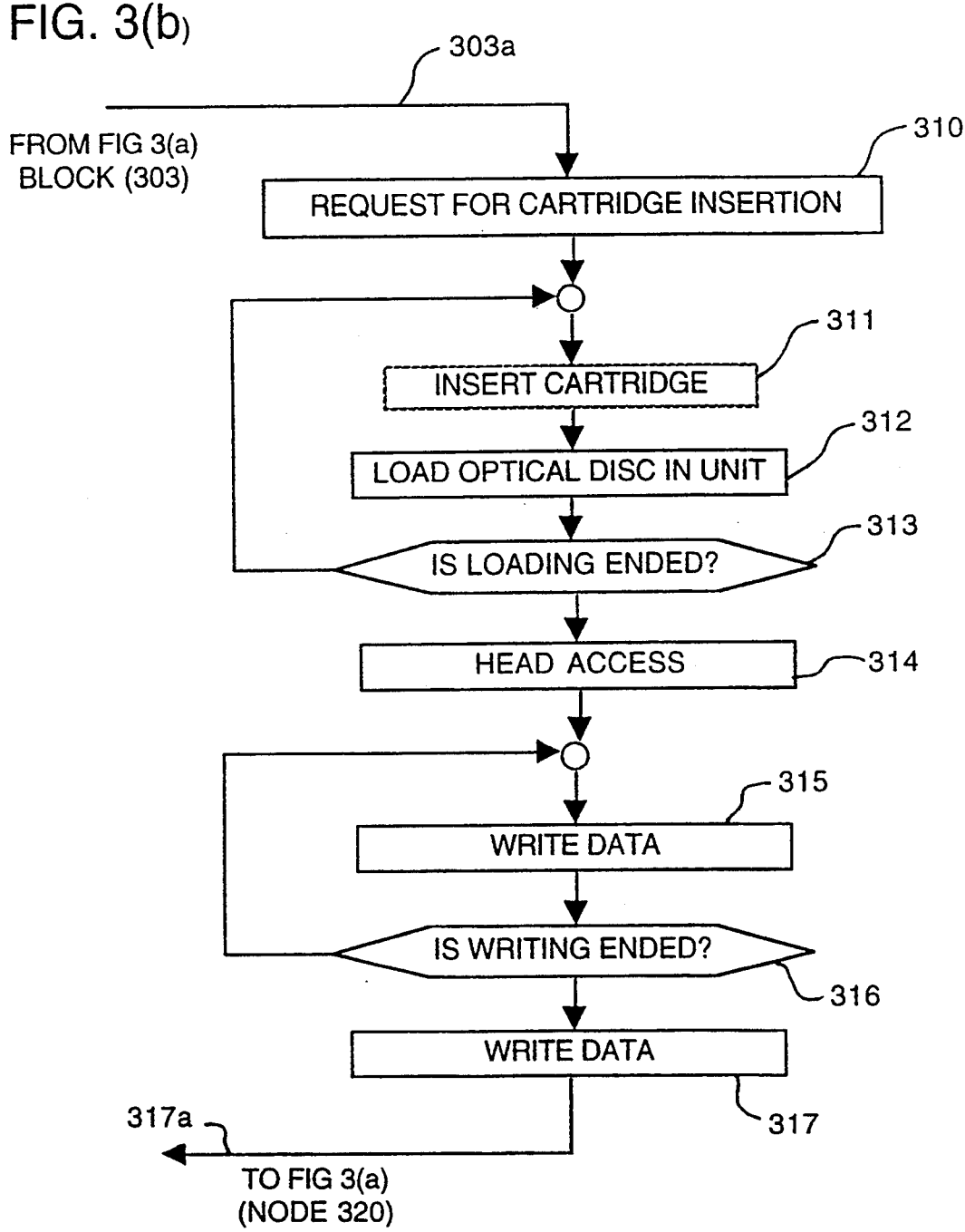

DISC RECORDING SYSTEM

FIELD OF THE INVENTION

The invention relates to a data storage/retrieval system having a plurality of disc recording media contained in a sealed unit, and more particularly to a disc recording/reproducing system for recording/reproducing data by accessing an arbitrary disc in the sealed unit.

BACKGROUND OF THE INVENTION

Recording/reproducing systems for massive storage and retrieval of data are generally of two types. One type is a library type wherein the discs are stored in cartridges or protective casings and positioned on shelves for access by a take-out transfer mechanism. When one disc is to be accessed, the disc with cartridge is retrieved from the shelf location by the take-out/-transfer mechanism and loaded into a recording/reproducing unit within the unit. The other type is a stack type wherein a plurality of discs are stacked on a common spindle and accessed by recording/reproducing heads provided for each of the recording faces of the discs. One or more heads are used in a stack type system for recording/reproducing data.

In the library type system, the recording/reproducing media is exchangeable. The shelves supporting the recording media, for example discs, are sealed to a certain extent against contamination by dust and other particles, but the extent of sealing is limited in order to enable prompt handling of the exchange of the discs. Dust contamination is not adequately prevented as a result. Since dust eventually adheres to the discs, cleaning is required to maintain a long service life of the system.

In order to overcome the dust contamination problem in the storage of discs in a library type system, it has been proposed, for example in Japanese patent laid-open application no. 276,056/1990, to house the recording medium transfer mechanism and the recording/reproducing unit in a sealed casing with the shelves of discs. This prevents dust from accumulating on the surfaces of the discs to a much greater extent than if the discs are housed in an unsealed casing.

In a stacked type system, the recording media are typically magnetic discs, such as hard discs. In a stacked type system using hard discs, the discs are completely sealed and therefore not exchangeable.

Although it is advantageous to enclose the discs in a sealed casing to minimize contamination from dust, the recording media is difficult to exchange. Thus, adding or exchanging recording media in both types of systems is difficult when the systems are enclosed in a sealed casing to prevent dust contamination.

SUMMARY OF THE INVENTION

It is an object of the invention to provide a sealed space recording/reproducing system for writing and reading data stored in either a library type or stacked type system while overcoming the problem of adding and exchanging the recording media.

One problem with using a data storage system having a sealed recording/reproducing system is that the system will fail to operate, i.e. the CPU will experience a time out, if the data to be stored exceeds the total storage capacity of the disc recording media housed therein. This failure will occur even if the data exceeds the storage capacity by only a small amount. Upon such a time out failure, the operator is forced to take corrective action to make room for the data to be stored. This slows the operating speed of the system and inconveniences the user, which is disadvantageous.

Accordingly, an object of the present invention is to overcome the disadvantages of the prior art recording-/reproducing system by providing a disc recording system that prevents dust contamination of the recording media while at the same time overcoming the problem of generating a system failure when the data to be written exceeds the total storage capacity of the system.

It is yet another object of the present invention to provide a sealed disc recording system having a separately available exchangeable recording media that enables copying of data mutually between the exchangeable recording medium and the recording media of the sealed space directly by an operator input command, not by the host computer.

By the present invention, a plurality of disc media can be stored in a recording/reproducing system of the library type wherein each of the discs, for example, optical discs, is stored on a shelf, but not in a protective casing. This permits higher speed access to each of the discs than would be gained if each were in a protective casing. Since there is a risk of writing data to these discs in an amount that exceeds the total storage capacity of all the discs, a separate cartridge type recording/reproducing means is provided for receiving a cartridge housed disc recording medium, such as an optical disc. The control unit of the system of the present invention controls the recording/reproducing units for both the sealed space discs and the cartridge disc so that the free space of the discs in the sealed casing can be monitored. When the control unit determines that no recording space remains in the discs of the sealed space recording media, or that an insufficient amount of space exists relative to a requested data write operation, the separate cartridge disc can be used with the cartridge recording-/reproducing unit to provide the needed extra data recording space.

The control unit for the system of the present invention manages the addresses of the stored data for the sealed discs and the cartridge type discs. In a read operation, it is determined which of the sealed discs or the cartridge discs holds the data requested by a host system. Once the disc location is determined, the data requested by the host system is read from either one of the discs in the sealed space or from the cartridge disc by the appropriate recording/reproducing unit.

The control unit of the present invention is also used to perform a data copying function in response to an operator input command. Data can be copied from one of the discs in the sealed space to another or between the cartridge type disc and the discs of the sealed space (and vice versa).

In order to perform the many control functions required by the system of the present invention, the control unit manages the stored data in accordance with the ID, the first address and data recording blank length of the disc recording media of the sealed space, as well as the cartridge type disc with respect to the data to be recorded or reproduced.

The sealed disc space has shelves for storing the disc recording media, for example optical discs. A disc access unit transfers a desired disc recording medium from its shelf location to a recording/reproducing unit for the sealed space discs, and vice versa. Accordingly, the recording/reproducing unit for the sealed space discs is commonly used by all of the sealed space discs. The system also includes a partially partitioned space formed in contact with an outer wall of the sealed casing so that a disc in the sealed space may be loaded or unloaded through this space. By this arrangement, the system can advantageously rely on the storage of discs in open shelf locations without the need for cartridges to contain the discs while still providing an exchange space within the sealed casing that is accessible from outside of the sealed space when discs are required to be exchanged.

The features of the present invention have been discussed with respect to providing optical discs in the sealed space, however, the sealed space can be constructed to contain a plurality of magnetic disc recording media stacked on a common spindle. In this arrangement, the recording/reproducing unit would have heads provided to face each of the recording faces of the individual magnetic disc recording media in order to perform the recording/reproducing function that is required.

In operation, ordinary data read/write operations are performed with the sealed space recording/reproducing unit for the sealed space discs. If data is to be written that exceeds the storage capacity (or recording capacity) of the sealed space disc recording media, the excess data can be written to the cartridge type recording/reproducing unit for storage on a cartridge type disc. As a result, the system is not subjected to a CPU time out when an excessive amount of data is requested to be written to the disc storage system. In this way, therefore, processing can continue without delay.

In the system of the present invention, the control unit controls the recording/reproducing units of both the sealed space and the exchangeable cartridge space. During data writing, therefore, the control unit selects a free disc and more particularly a free area of a disc to write the data. If the sealed space recording media have no free space, this condition is determined and output as a message to the operator of the system that no free disc space is available. For example, this message can be displayed on a display unit, which is part of the data storage/retrieval system. In this case, the operator can then load a cartridge type disc into the cartridge space for access by the cartridge recording/reproducing unit so that any excess data to be written to the storage/retrieval system can be recorded on the cartridge type disc.

During data reading, the control means functions to determine which disc of the sealed disc recording media or the cartridge type discs is stored with the data requested by the host computer. If the data exists in the sealed space disc recording media, then the disc having the data is accessed by the disc access unit and transferred to the sealed space recording/reproducing unit. If the required data is recorded on the cartridge type disc, then the control unit outputs a message for display on the display unit to inform an operator to load a cartridge type disc recording medium into the exchangeable cartridge space. The operator then follows the message that is output and loads the cartridge type recording/reproducing unit with the requested cartridge type discs so that the requested data can be read therefrom.

In the data copying operation, the control unit uses an internal buffer memory to copy data from a cartridge-type disc onto one of the sealed space discs. For example, an operator, after loading one of the cartridge type discs, inputs through an input unit to the control unit a command for performing the copying operation. In this mode, the control unit provides the necessary control information, e.g. the ID of the cartridge type disc recording media, the first address and the data length of the data to be copied. In response to the command issued by the control unit, a free disc is selected among the sealed disc recording media and the cartridge disc data to be copied is read out and stored in a buffer memory in the control unit. Then, the control unit executes the copying operation by writing the data stored in the buffer memory to the selected disc in the sealed disc recording media.

According to a preferred manner of accomplishing the foregoing operations, the control unit manages the sealed space discs and cartridge type discs, as well as the corresponding recording/reproducing units, in accordance with management data that is stored on the disc recording media and in the memory for the control unit. The management data represents the recorded and unrecorded areas of the individual discs in the sealed space and this management data is referred to in data read/write operations. The management data, such as the ID of the individual cartridge type discs accessed through the exchangeable cartridge recording/reproducing unit, the first address and data length in each disc are written in the data writing operations so that the management data is referred to or computed in the subsequent data reading operation.

BRIEF DESCRIPTION OF THE DRAWINGS

FIGS. 3(a) and 3(b) taken together show a flow chart explaining a data write operation using the storage retrieval system of the present invention.

DETAILED DESCRIPTION OF THE PREFERRED EMBODIMENTS

Figure 1:
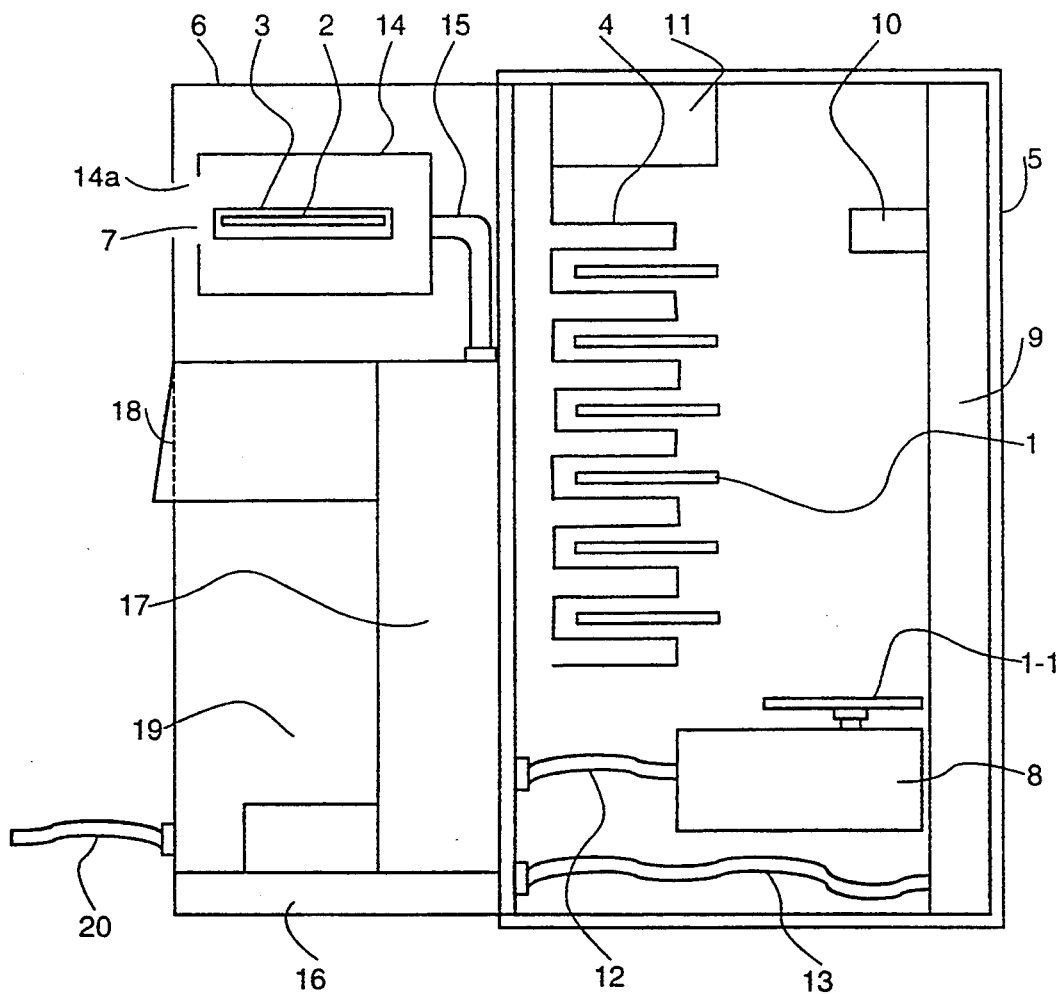
FIG. 1 is a schematic representation of a disc recording/retrieval system of a first embodiment of the present invention.

The disc storage and retrieval system of a first embodiment of the present invention is shown in FIG. 1. Disc recording media, such as optical discs 1 are contained within a sealed casing 5 on a plurality of shelves. Each optical disc shelf 4, shown schematically in FIG. 1, supports an optical disc 1. The optical discs 1 are exposed as opposed to being enclosed individually by protective casings or cartridges. Each has a free end facing an interior space of the sealed casing 5 that can be accessed by a disc access unit having a disc carrying device or picker 10 and a mechanism 9 for moving the carrier, shown schematically. Carrier 10 can have one or more fingers, for example, that are adapted to slide under a disc to be retrieved from a shelf 4 and loaded onto a turntable of an optical disc unit 8 for recording/reproducing data, which is also enclosed within the sealed casing 5. Since the discs 1, disc access unit and optical disc unit 8 are all enclosed in sealed casing 5, contamination from dust is reduced to a minimum.

Adjacent the sealed casing 5 is a casing 6, preferably integrally constructed with sealed casing 5. Casing 6 houses an optical disc recording/reproducing unit 14 that accepts optical discs encased in a cartridge. Such optical discs are protected by the cartridge from dust and contamination, and can be inserted into the optical disc unit 14 through a cartridge slot 14A in the opening 7 of the unit. The optical discs 2 adapted for use with the optical disc unit 14 differ from the optical discs 1 in that the exchangeable protective case or cartridge 3 is used to contain the optical disc when it is not loaded into the optical disc unit.

The system has a display/keyboard unit 18 that permits an operator to input commands and data concerning operation of the system and that also provides messages and other graphic information for display to the operator. The system is connected to a host computer, not shown, through a cable 20. In operation, control of the optical disc unit 8 is maintained by drive control unit 17, connected thereto through connection cable 12. Optical disc unit 14 also operates under control of the drive control unit 17, which is connected thereto by a cable 15. A library control unit 19 manages transfer of data for the plurality of optical discs 1 in the sealed space of casing 5, as well as the optical discs 2 exchanged in the optical disc unit 14. When data is transferred between the discs 1 and 2, and a host computer, this library control unit 19 controls the transfer. Accesser control unit 16 controls moving mechanism 9 and disc carrier 10 and is connected thereto by cable 13.

As a result of providing the optical discs 1 in the sealed casing 5 without protective covers, the disc access time, or the time for exchanging optical discs 1 for read/write operations with optical disc unit 8, is significantly improved in comparison with that of a system having a plurality of cartridge type optical discs on shelves that must be exchanged with the optical disc unit. To maintain the integrity of the sealed casing 5, a disc transfer space 11 is provided through which optical discs 1 can be exchanged without introducing dust contamination to the sealed space. This permits flexibility in the set up of the storage and retrieval system with respect to the sealed space storage media.

Figure 2:
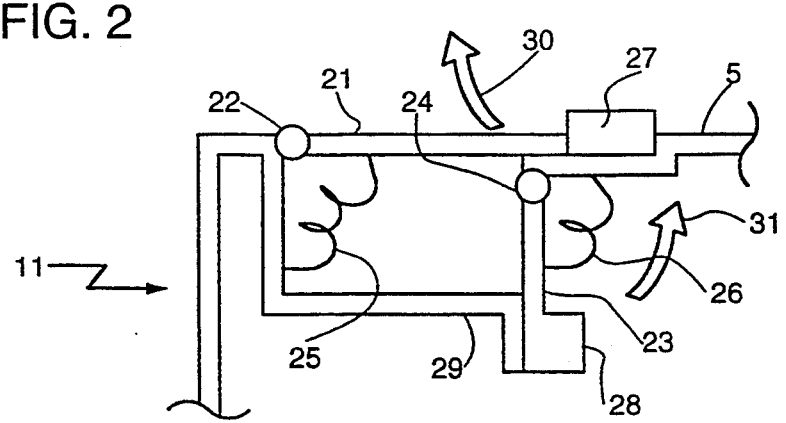
FIG. 2 is a schematic drawing of a sealed space access compartment.

In FIG. 2, the disc transfer space 11 is shown in greater detail. In particular, space 11 has a door 21 that permits access to the space from the exterior of the system while door 23 provides access to the space from within the sealed casing 5. Door 21 is pivotally mounted by hinges 22 to an outer wall of the casing. The door swings open in the direction of arrow 30 to permit access to the interior thereof. A limit sensor 27 is provided to generate signals indicating whether door 21 is in the opened or closed position. Similarly, door 23 is pivotally mounted by hinges 24 to open and close in the direction of the arrow 31 into the sealed space of casing 5. A limit sensor 28 is provided to monitor the opened and closed positions of door 23. Springs 25 and 26 are provided to ensure that each door is spring biased to its closed position in order to effectively seal off space 11 when it is not being used for access to the sealed space of casing 5.

When access to the sealed space of casing 5 is desired, the doors 21 and 23 can be opened and closed by motors, not shown. For example, an optical disc can be transferred into the sealed casing 5 by first opening door 21 manually (or automatically), inserting an optical disc in space 11 at a predetermined position and then shutting door 21. Next, in response to a signal from sensor 27 that the door 21 is shut, and an optional sensor signal that the optical disc 1 is positioned in the predetermined position within space 11, door 23 is opened. Then, the disc access unit removes the optical disc from space 11 and transfers it to the desired shelf 4. Then, in response to a signal received from a sensor, not shown, in space 11 that the disc has been removed therefrom, door 23 is shut. The shut position of door 23 can be verified by a signal output from sensor 28. A similar procedure can be followed in reverse order to retrieve an optical disc 1 from within sealed casing 5.

Since the sealed space in casing 5 prevents dust contamination of the discs, protective cases or cartridges are not required. Further, since there is no protective case or cartridge for each disc, the discs can be stored closer together so that the interval between discs can be reduced. This permits a larger number of optical discs to be stored in a common area as compared with storing discs having cartridges or casings. Access time with the system of the present invention can be very efficient when optical discs 1 of preferably 130 mm diameter and that conform to the ISO standards are used. According to these standards, the optical disc has a magnetic metal that is attracted by a magnet fixed on the upper face of a spindle motor or turntable of the optical disc unit. For example, an optical disc 1-1 can be transferred for recording/reproducing with optical disc unit 8 by merely placing the disc on the spindle motor. As a result, the loading/unloading actions of the disc access unit can be simplified.

Providing the discs 1 and the optical disc control unit 8 within a sealed space of casing 5 is intended to eliminate dust contamination. However, it is not possible to completely eliminate dust from entering in casing 5. For example, dust can be produced by the motions of the internal mechanisms associated with the disc access unit. To suppress the accumulation of dust in the casing, the casing is equipped with a filter for trapping dust, not shown. The dust can be trapped by circulating air throughout the casing and disposing the filter in the air circulation flow path. On the other hand, if the air is always in circulation, the optical discs 1 may be exposed to a greater risk of dust contamination from the circulating air. Therefore, it is preferable to attach a dust trapping filter to a portion of the disc carrier 10 so that as the picker moves vertically, an airflow is generated that passes through the filter for trapping dust.

Casing 6, which accepts the cartridge type optical disc 2 has no significant sealing structure like that of casing 5. Of course, dust contamination is undesirable, but the access to optical disc unit 14 for exchanging cartridge type optical discs 2 is important for operation of the system. Thus, an opening 7 is provided for inserting and withdrawing cartridges 3 having a disc 2 therein, the cartridge being specifically inserted in cartridge slot 14A. A conventional loading mechanism in the optical disc unit 14 operates to load a disc with cartridge received through slot 14A by first opening the shutter of the cartridge and then loading the optical disc 2. The details of this operation are not disclosed since optical disc units for cartridge type optical discs are conventional.

In operation of the system with a host computer, the discs of the library type system are used exclusively unless the storage capacity for the discs is at risk of being exceeded. The library control unit 19 has a memory for storing management data indicating the presence of free disc space. The control unit monitors the management data to determine if the data requested to be stored from the host computer exceeds the storage capacity of the optical discs 1 in the library system. If the storage capacity is to be exceeded by a write request from the host computer, the library control unit 19 displays a message on the display unit 18 requesting an operator to insert a new cartridge in the optical disc unit 14. Once an optical disc 2 is loaded in the optical disc unit 14, the library control unit 19 directs the data that is in excess of the capacity of optical discs 1 to be stored on optical disc 2. In conjunction with storing the excess data on optical disc 2, control unit 19 stores a designated track of optical disc 2 in its memory as management data. The management data includes the ID number of the optical disc 2 and the data required for retrieving the excess data just recorded, such as the calling address determined by a library management software system in the computer, the leading address, the track address, the selector address and the data length concerning the block of data recorded on the optical disc 2. In this regard, it is preferable that discs 1 and 2 are formatted in the same manner.

Figure 3A:
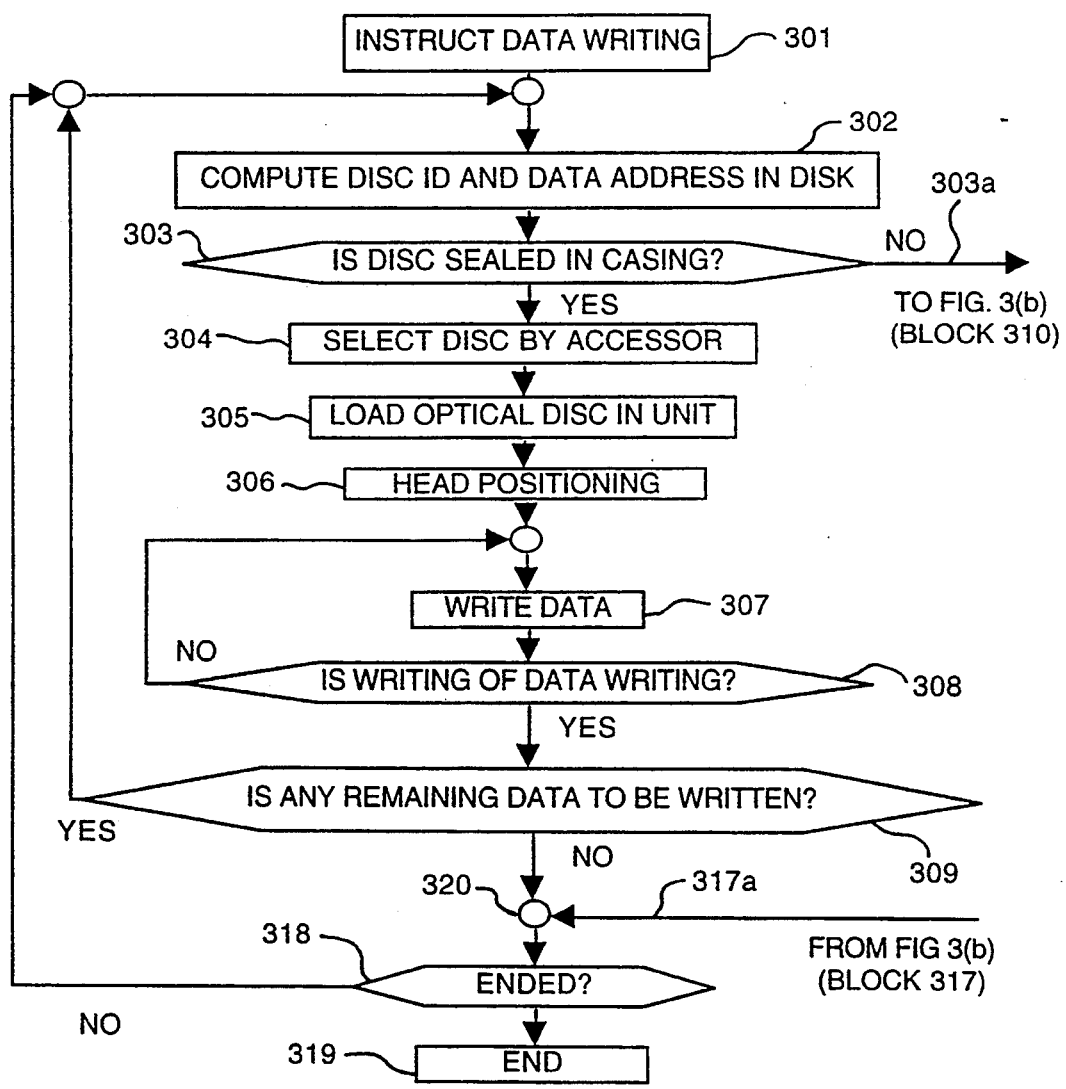

The storage and retrieval system performs writing, reading and copying or duplicating of data. FIGS. 3(a) and 3(b) taken together show a flow chart showing the basic operation of one embodiment of a data writing operation. The data writing operation is initiated when the host computer issues a data write command in step 301. Then, the disc ID and address of the disc is examined by the library control unit 19 in step 302 to determine whether or not there is a free disc within sealed casing 5 for writing the data (step 303). If an available optical disc 1 is present, then the data is written onto the selected optical disc 1 by following the steps of selecting the disc by the access unit (accessor) in step 304, loading the optical disc in the optical disc unit 8 in step 305, positioning the optical read/write head in step 306 and writing the data in steps 307–309. More specifically, in step 307 and 308, it is determined whether the data writing operation is continuing or not, and in step 309 it is determined whether any data remains to be written.

If in step 303 it is determined that the optical discs 2 in sealed casing 5 do not have sufficient free space for completing the requested data writing operation, on the other hand, the flow proceeds in the direction of arrow 303a to block 310 shown in FIG. 3(b). In step 310, a message is displayed on display unit 18 that requests the operator to insert a cartridge 3 with optical disc 2 contained therein into the optical disc unit 14. The cartridge is inserted in step 311 and the optical disc 2 is loaded in step 312 and the completion of the loading operation is determined in step 313. Once the optical disc 2 is loaded in the optical disc unit 14, the optical read/write head is positioned in step 314 and the data written in step 315. The writing operation is monitored in step 316 to determine when the writing is completed. Then, the flow proceeds to step 317 whereupon the ID number of the optical disc 2 in the optical disc unit 14 and the data required for retrieving the just recorded access data are written to the library control unit 19 in step 317. With this writing operation completed, the flow proceeds in the direction of arrow 317a to node 320 shown in FIG. 3(a), whereupon it is determined that the original request from the host computer to write the data is ended in steps 318 and 319.

The data reading operation is similar to that of the data writing operation. Upon receiving a data read command, library control unit 19 detects whether the optical disc requested by the computer is in the sealed casing 5 or not. If not, the ID of the necessary optical disc 2 is displayed on display unit 18 with the request that the operator insert the required disc. The operator then inserts the necessary disc in the optical disc unit 14 and the directory of the optical disc 2 is read by the library control unit 19 to confirm that the correct disc has been inserted. Then, the optical read/write head of the optical disc unit 14 is positioned to read the disc 2 and transfer the read out data to the library control unit 19. Although this procedure requires intervention by an operator, the flexibility of using the optical disc library in sealed casing 5 is increased since 100% of the storage capability of the disc storage media can be freely accessed.

Another operation capable of being performed by the storage and retrieval system of the present invention is a data copying operation that does not involve the host processor, explained herein with respect to duplicating data of an optical disc 2 on an optical disc 1. First, the operator loads optical disc 2 in the optical disc unit 14 and inputs the ID of the source data and the address and data length of the data to be copied through the keyboard of the display keyboard unit 18. The library control unit 19 selects a free optical disc 1 in accordance with the management data of these discs and the selected disc is loaded on the optical disc unit 8. The data read from optical disc 2 is then stored in the buffer memory 19(a) of the library control means 19. When the optical disc unit 8 writes data into a predetermined area of disc 1, the library control unit 19 sends the data from the buffer memory 19(a) to the optical disc unit 8 and writes the data on the optical disc 1. Then, display unit 18 displays the ID of optical disc 1 and the address of the location where the data is written. When data is to be copied onto a cartridge disc 2 from an optical disc 1, a similar procedure is performed in reverse.

Figure 4:
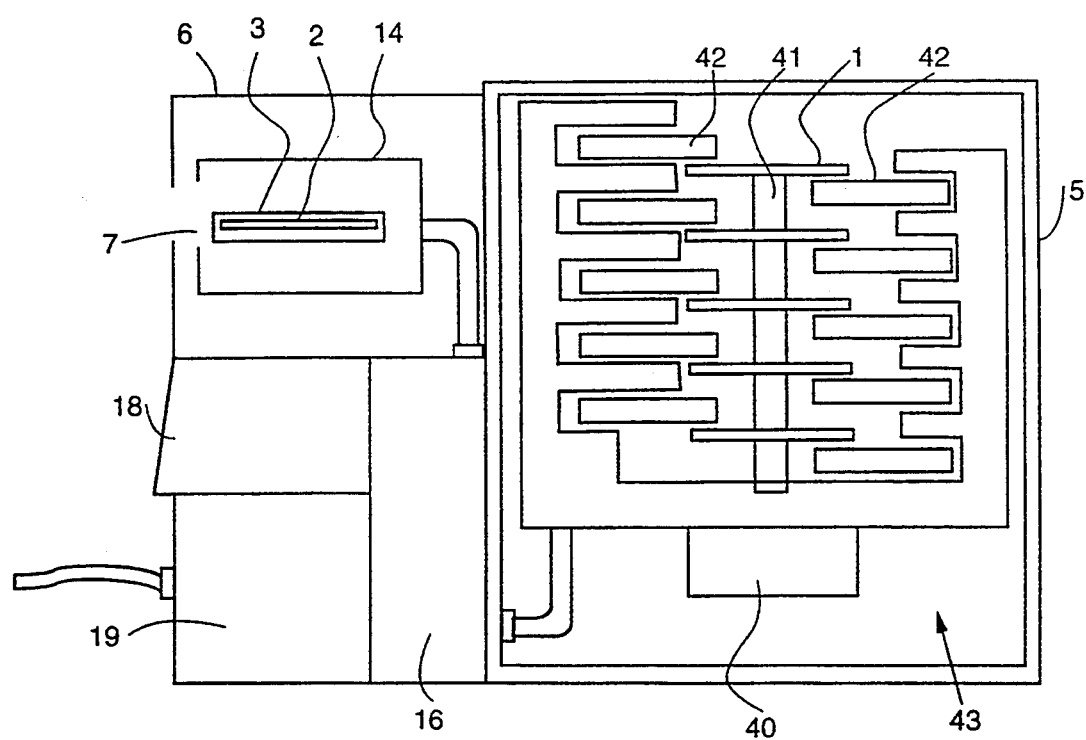
FIG. 4 is a schematic representation of a disc recording/retrieval system of a second embodiment of the present invention.

A second embodiment of the present invention is shown in FIG. 4, which has components that perform the same functions as those identified by common reference numerals in FIG. 1. In the second embodiment, a stacked type optical disc unit 43 is disposed in sealed casing 5. The optical disc unit 43 has a plurality of optical discs 1 stacked on a common shaft 41 and turned by motor 40. Optical read/write heads 42 are provided for each of the recording phases of the optical discs. Alternatively, hard magnetic discs can replace the optical disc system shown in FIG. 4. Whether or not optical or hard magnetic discs are used in the second embodiment for the storage and retrieval system of the present invention, the operation of the system is the same. Mainly, storage and retrieval of data is performed by a host computer by accessing the disc unit 43, unless a write operation specifies the writing of the data in excess of the free space available in the optical disc unit 43. In this case, the excess data is written to the optical disc unit 14 as in the first embodiment. Similarly, data is read from the optical disc unit 43 unless a data read operation requests data that has been written on an optical disc 2, in which case the read operation is handled in the same way as explained with respect to the first embodiment.

By the present invention, the storage capacity of the storage and retrieval system of the present invention is made more flexible and effectively increased during operation of the system. When the quantity of data to be written temporarily exceeds the storage capacity of the storage media encased in the sealed casing, the excess data is written to a juxtaposed interchangeable read/write unit automatically by a control unit. This prevents the CPU from experiencing a time out during a data write operation and permits the use of 100% of the storage capacity of the sealed space discs.

Furthermore, according to the present invention, data can be easily copied from one of the sealed space storage media to the cartridge type storage media and vice versa in response to receiving a command from the operator input through the system's keyboard unit, or in response to a command received from a host computer. Since, in this case, a control unit is provided for managing the disc recording media of both recording/reproducing units, a copying operation can be performed without occupying the host computer after the command is received from either the operator's input or the host computer. As a result, the efficiency of the computer system is improved.

We claim:

1. A data storage and retrieval system, comprising:
   a first sealed casing containing a plurality of first data storage discs, a first recording/reproducing unit and a disc access unit wherein the plurality of first discs are exposed and stored in a library arrangement for direct access by the disc access unit and the disc access unit loads/unloads the first discs on the recording/reproducing unit;
   a second casing juxtaposed to said sealed casing for containing a second recording/reproducing unit for recording/reproducing data on one of a plurality of second data storage discs which are cartridge type discs, said second recording/reproducing unit having an access slot for exchanging the second discs;
   control means controlling operation of said first and second recording/reproducing units and for managing transferring of data between said storage and retrieval system and an external data processor; and
   said control means being for controlling the writing of data from an external data processor to said plurality of first discs when said first discs have sufficient free space to complete the writing of the data and said control means being for further controlling the writing of the data to said second recording/reproducing unit when a total storage capacity of said first discs is reached.

2. A data storage and retrieval system according to claim 1, wherein said control means has a memory for storing management information, said management information including data identifying an ID of said one second disc, an address of data stored on said one second disc and a data length of the stored data.

3. A data storage and retrieval system according to claim 1, wherein said plurality of first discs are optical discs and said plurality of second discs are optical discs.

4. A data storage and retrieval system according to claim 2, wherein said plurality of first discs are optical discs and said one second disc is an optical disc.

5. A data storage and retrieval system according to claim 1, wherein said sealed casing has a disc transfer space for transferring ones of said first discs inside/outside said sealed casing.

6. A data storage and retrieval system according to claim 5, wherein said disc transfer space has first and second doors resiliently biased in the closed position such that a first door opens to an exterior of said casing and said second door opens to an interior of said sealed casing.

7. A data storage and retrieval system according to claim 1, wherein said control means controls said first and second recording/reproducing units when a copying operation is performed that copies data from said one second disc to one of said first discs.

8. A data storage and retrieval system according to claim 7, wherein said control means has a buffer memory whereby the data to be copied from said one second disc is stored in said buffer memory and then transferred to said one of said first discs to complete the copying operation.

9. A data storage and retrieval system according to claim 1, further comprising a display/keyboard unit for receiving data input by an operator and for displaying messages output from said control means informing an operator of a disc ID for said second disc, a message informing an operator that the storage capacity has been reached for said plurality of first discs and said keyboard permitting input of commands for copying data between said first and said second disks.

10. A data storage and retrieval system according to claim 2, further comprising a display/keyboard unit for inputting data by an operator and for displaying data; and said second control means having means processing management data during a read operation for determining an ID of one of said second discs and displaying said ID on said display/keyboard unit for instructing an operator to load a predetermined one of the second discs into the second recording/reproducing unit.

11. A data storage and retrieval system according to claim 1, further comprising a display/keyboard unit for receiving data input by an operator and for displaying a message informing an operator that the total storage capacity of said first discs has been reached.

12. A data storage and retrieval system according to claim 1, wherein said plurality of first discs are stacked on a common spindle in said sealed casing and said recording/reproducing unit has a plurality of recording/reproducing heads disposed adjacent each recording face of said first discs.

13. A data storage and retrieval system, comprising:
   a first sealed casing containing a plurality of first data storage discs, a first recording/reproducing unit and a disc access unit wherein the plurality of first discs are stored in an exposed state on shelves in said casing and positioned for direct access by the disc access unit which loads/unloads the first discs on the recording/reproducing unit;
   a second casing juxtaposed to said sealed casing for containing a second recording/reproducing unit for recording/reproducing data on one disc at a time of a plurality of second data storage discs which are cartridge type discs stored outside of said system, said second recording/reproducing unit having an access slot for receiving said second discs for loading/unloading said second discs on said recording/reproducing unit;
   a first control unit for controlling operation of said first and second recording/reproducing units;
   a second control unit for controlling said disc access unit for loading/unloading said first discs on said first recording/reproducing unit;
   a third control unit for managing transferring of data between said storage and retrieval system and an external data processor; and
   said third control unit controlling the writing of data from an external data processor to said plurality of first discs and for maintaining management information concerning a storage capacity of a total of all of said first discs, wherein said third control unit transfers data during a write operation to said second recording/reproducing unit when the total storage capacity of said plurality of first discs is reached in accordance with a determination made on the basis of said management information so that a part of the data being written is stored on one of said second discs.

14. A data storage and retrieval system according to claim 13, wherein said third control unit has a memory for storing said management information, said management information including information on said part of said data that identifies an ID of one of said second discs on which said part of said data has been recorded, an address of the data part stored on said one second disc and a data length of the stored data part.

15. A data storage and retrieval system according to claim 13, wherein said plurality of first discs are optical discs and said plurality of second discs are optical discs.

16. A data storage and retrieval system according to claim 14, wherein said plurality of first discs are optical discs and said one second disc is an optical disc.

17. A data storage and retrieval system according to claim 13, wherein said sealed casing has a disc transfer space for transferring ones of said first discs inside/outside said sealed casing.

18. A data storage and retrieval system according to claim 16, wherein said disc transfer space has first and second doors resiliently biased in the closed position such that a first door opens to an exterior of said casing and said second door opens to an interior of said sealed casing.

19. A data storage and retrieval system according to claim 1, wherein said third control unit controls said first and second recording/reproducing units when a copying operation is performed that copies data from said one second disc to one of said first discs.

20. A data storage and retrieval system according to claim 19, wherein said third control unit has a buffer memory whereby the data to be copied from said one second disc is stored in said buffer memory and then transferred to said one of said first discs to complete the copying operation.

21. A data storage and retrieval system according to claim 14, further comprising a display/keyboard unit for inputting data by an operator and for displaying data; and said third control unit having means processing said management data during a read operation for determining an ID of said second discs and displaying same on said display/keyboard unit for instructing an operator to load a predetermined one of the second discs into the second recording/reproducing unit so that data requested by the read operation is read from said predetermined second disc.

22. A data storage and retrieval system according to claim 13, further comprising a display/keyboard unit for receiving data input by an operator and for displaying a message informing an operator that the total storage capacity of said first discs has been reached.

23. A data storage and retrieval system according to claim 13, wherein said plurality of first discs are stacked on a common spindle in said sealed casing and said recording/reproducing unit has a plurality of recording/reproducing heads disposed adjacent each recording face of said first discs.

24. A data storage and retrieval system, comprising:
a first sealed casing containing a plurality of first data storage discs, a first recording/reproducing unit and a disc access unit wherein the plurality of first discs are exposed and stored in a library arrangement for direct access by the disc-access unit and the disc access unit loads/unloads the first discs on the recording/reproducing unit;
a second casing juxtaposed to said sealed casing for containing a second recording/reproducing unit for recording/reproducing data on one of a plurality of second data storage discs which are cartridge type discs, said second recording/reproducing unit having an access slot for exchanging the second discs;
control means controlling operation of said first and second recording/reproducing units and for managing transferring of data between said storage and retrieval system and an external data processor; and
said control means being for controlling said first and second recording/reproducing units when a copying operation is performed that copies data from said one second disk to one of said first disks.

25. A data storage and retrieval system according to claim 24, wherein said control means has a buffer memory whereby the data to be copied from said one second disk is stored in said buffer memory and then transferred to said one of said first disks to complete the copying operation.

26. A data storage and retrieval system according to claim 25, further comprising a display/keyboard unit for receiving a command for performing the copying operation, and said control unit after receiving said command from said display keyboard unit executing the copying operation independently from said external data processor.

27. A data storage and retrieval system, comprising:
a first sealed casing containing a plurality of first data storage discs, a first recording/reproducing unit and a disc access unit wherein the plurality of first discs are stored in an exposed state on shelves in said casing and positioned for direct access by the disc access unit which loads/unloads the first discs on the recording/reproducing unit;
a second casing juxtaposed to said sealed casing for containing a second recording/reproducing unit for recording/reproducing data on one disc at a time of a plurality of second data storage discs which are cartridge type discs stored outside of said system, said second recording/reproducing unit having an access slot for receiving said second discs for loading/unloading said second discs on said recording/reproducing unit;
a first control unit for controlling operation of said first and second recording/reproducing units;
a second control unit for controlling said disc access unit for loading/unloading said first discs on said first recording/reproducing unit;
a third control unit for managing transferring of data between said storage and retrieval system and an external data processor; and
said third control unit controlling said first and second recording/reproducing units when a copying operation is performed that copies data from one said second disk to one of said first disks.

28. A data storage and retrieval system according to claim 27, wherein said third control unit has a buffer memory whereby the data to be copied from said one second disk is stored in said buffer memory and then transferred to said one of said first disks to complete the copying operation.

29. A data storage and retrieval system according to claim 28, further comprising a display/keyboard unit for receiving a command for performing the copying operation, and said control unit after receiving said command from said display keyboard unit executing the copying operation independently from said external data processor.

* * * * *